United States Patent
Kim et al.

(10) Patent No.: US 8,260,385 B2
(45) Date of Patent: Sep. 4, 2012

(54) MOBILE TERMINAL AND AN ANTENNA FOR A MOBILE TERMINAL

(75) Inventors: Jungha Kim, Seoul (KR); Namyong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 12/943,888

(22) Filed: Nov. 10, 2010

(65) Prior Publication Data

US 2011/0165915 A1     Jul. 7, 2011

(30) Foreign Application Priority Data

Jan. 7, 2010   (KR) .................. 10-2010-0001396

(51) Int. Cl.
*H04M 1/00*   (2006.01)
*H04K 3/00*   (2006.01)
(52) U.S. Cl. ..................................... 455/575.7; 343/702
(58) Field of Classification Search .... 455/575.1–575.7; 343/702, 700 MS
See application file for complete search history.

(56) References Cited

U.S. PATENT DOCUMENTS

| | | | |
|---|---|---|---|
| 2002/0021250 A1* | 2/2002 | Asano et al. | 343/702 |
| 2002/0151328 A1* | 10/2002 | Shin et al. | 455/557 |

* cited by examiner

*Primary Examiner* — Lee Nguyen
(74) *Attorney, Agent, or Firm* — Lee, Hong, Degerman, Kang & Waimey

(57) ABSTRACT

A mobile terminal includes a body having a display unit for displaying at least visual information or a user input unit for inputting a control command on one surface of the display unit. The mobile terminal also includes an antenna pattern positioned near the display unit or the user input unit. The antenna pattern transmits or receives a wireless signal. The display unit or the user input unit is configured to transmit light therethrough from one surface of the body to an opposite surface of the body. The antenna pattern is formed at an end or side surface of the body that is transverse to the surface on which the display unit or user input unit is positioned and is positioned away from the display unit or the user input unit.

22 Claims, 11 Drawing Sheets

MOBILE TERMINAL AND AN ANTENNA FOR A MOBILE TERMINAL

CROSS-REFERENCE TO RELATED APPLICATION

Pursuant to 35 U.S.C. §119(a), this application claims the benefit of earlier filing date and right of priority to Korean Application No. 10-2010-0001396, filed on Jan. 7, 2010, the contents of which is incorporated by reference herein in its entirety.

FIELD OF THE INVENTION

The present invention relates to a mobile terminal, and particularly, to a mobile terminal having an antenna for transmitting or receiving a wireless signal.

DESCRIPTION OF THE RELATED ART

Generally, terminals can be classified into mobile terminals and stationary terminals according to a presence or non-presence of mobility. Mobile terminals can be also classified into handheld terminals and vehicle mount terminals according to whether they are configured to be carried by hand.

As mobile terminals have various functions in addition to communication, such as capturing images and video via a camera, playing music files or video, playing games, or receiving broadcasts, mobile terminals are implemented in the form of comprehensive multimedia players. Efforts are ongoing to support and increase the complicated functions of the multimedia players. Such efforts include a touch screen and a user interface (UI) allowing a user to easily and conveniently manipulate and select menus.

As mobile terminals are regarded as personal belongings for expressing users' personalities, various designs are required. The various designs include structural changes and improvements to enhance the user's convenience. An antenna may be considered one of the items needing structural changes and improvements.

SUMMARY OF THE INVENTION

Accordingly, an object of the present invention is to provide a mobile terminal having a slimmer configuration and an antenna for the mobile terminal. Another object of the present invention is to provide a mobile terminal having a transmissive case in which the antenna is not visible from outside the mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings. For the sake of brief description with reference to the drawings, the same or equivalent components will be provided with the same reference numbers, and description thereof will not be repeated. The suffixes attached to components of the mobile terminal, such as 'module' and 'unit' or 'portion' were used for facilitation of the detailed description of the present invention. The suffixes do not have different meanings from each other.

The mobile terminal according to the present invention may include mobile phones, smart phones, laptop computers, digital broadcasting terminals, Personal Digital Assistants (PDA), Portable Multimedia Players (PMP), and navigation systems.

Figure 1:
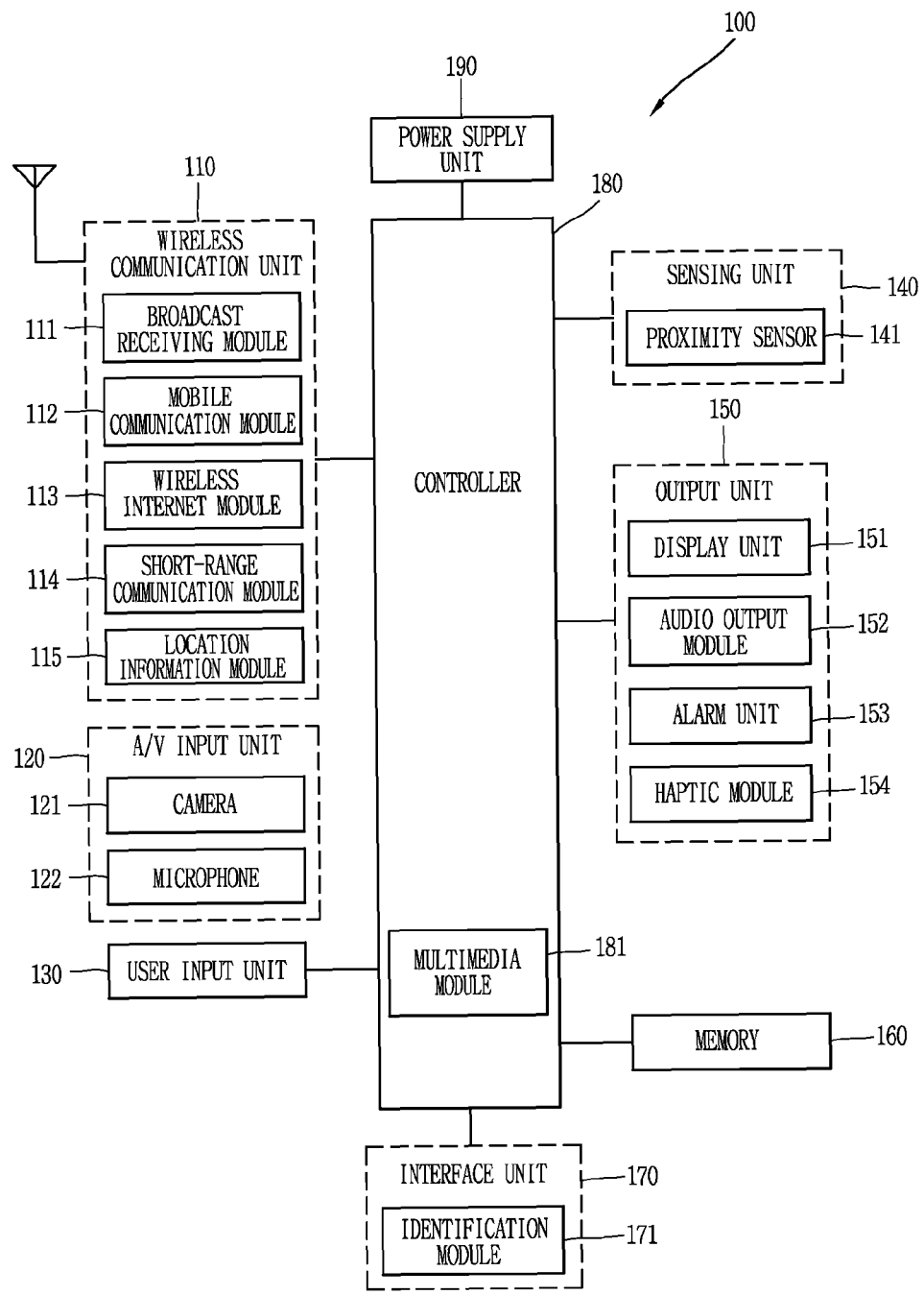
FIG. 1 is a block diagram of a mobile terminal according to an embodiment of the present invention.

FIG. 1 is a block diagram of a mobile terminal according to an embodiment of the present invention. The mobile terminal 100 may include a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 shows the mobile terminal 100 having various components, but it should be understood that implementing all of the illustrated components is not a requirement. A greater or smaller number of components may alternatively be implemented. The elements of the mobile terminal will be described in detail as follows.

The wireless communication unit 110 typically includes one or more elements allowing wireless communications between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114 and a location information module 115.

The broadcast receiving module 111 receives broadcast signals and/or broadcast associated information from an external broadcast managing entity via a broadcast channel.

The broadcast channel may include a satellite channel and/or a terrestrial channel. The broadcast managing entity may refer to a server that generates and transmits a broadcast signal and/or broadcast associated information or a server that receives a pre-generated broadcast signal and/or broadcast associated information and transmits them to the mobile terminal 100. The broadcast signal may include a TV broadcast signal, a radio broadcast signal and a data broadcast signal as well as a broadcast signal in a form of a data broadcast signal coupled to the TV or radio broadcast signal.

The broadcast associated information may refer to information regarding a broadcast channel, a broadcast program or a broadcast service provider. Further, the broadcast associated information may be provided via a mobile communication network and received by the mobile communication module 112.

The broadcast associated information may exist in various forms. For example, broadcast associated information may include an Electronic Program Guide (EPG) of Digital Multimedia Broadcasting (DMB) or Electronic Service Guide (ESG) of Digital Video Broadcast-Handheld (DVB-H).

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO®), Digital Video Broadcast-Handheld (DVB-H), or Integrated Services Digital Broadcast-Terrestrial (ISDB-T). The broadcast receiving module 111 may be configured to be suitable for every broadcast system that transmits broadcast signals as well as the above-mentioned digital broadcasting systems. Broadcast signals and/or broadcast associated information received via the broadcast receiving module 111 may be stored in a suitable device, such as the memory 160.

The mobile communication module 112 transmits and/or receives wireless signals to and/or from at least one network entity (e.g., base station, an external terminal, a server, etc.) on a mobile communication network. The wireless signals may include an audio call signal, a video call signal, or various formats of data according to transmission and/or reception of text and/or multimedia messages.

The wireless Internet module 113 supports wireless Internet access for the mobile terminal 100. The wireless Internet module 113 may be built into the mobile terminal 100 or installed external to the mobile terminal. Examples of such wireless Internet access may include Wireless LAN (WLAN), Wi-Fi®, Wireless Broadband (Wibro®), World Interoperability for Microwave Access (Wimax®), or High Speed Downlink Packet Access (HSDPA).

The short-range communication module 114 is a module for supporting short-range communications. The short-range communication module 114 may utilize a short-range communication technology, such as Bluetooth®, Radio Frequency IDentification (RFID), Infrared Data Association (IrDA), Ultra-WideBand (UWB), or ZigBee®.

The location information module 115 is a module for detecting or calculating a position of a mobile terminal. One representative example of the location information module 115 is a Global Positioning System (GPS) module. The GPS module can measure accurate time and distance respectively from more than three satellites to accurately calculate a current position of the mobile terminal based on at least three different distances using a triangulation scheme. For example, the scheme may be used to obtain time information and distance information from three satellites and correct error by at least one additional satellite. Also, the GPS module may continuously calculate a current position in real time to obtain speed information.

The A/V input unit 120 is configured to provide audio or video signal input to the mobile terminal 100. The A/V input unit 120 may include a camera 121 and a microphone 122.

The camera 121 receives and processes image frames of still pictures or video obtained by image sensors in a video (telephony) call mode or an image capturing mode. The processed image frames may be displayed on a display unit 151.

The image frames processed by the camera 121 may be stored in the memory 160 or transmitted to an external device via the wireless communication unit 110. Two or more cameras 121 may be provided according to the environment in which the mobile terminal is used.

The microphone 122 may receive an external audio signal while the mobile terminal 100 is in a particular mode, such as a phone call mode, a recording mode, or a voice recognition mode. The audio signal is processed into digital data. The processed digital data is converted for output into a format that is transmittable to a mobile communication base station via the mobile communication module 112 in the phone call mode. The microphone 122 may include assorted noise removing algorithms to remove noise generated in the course of receiving the external audio signal.

The user input unit 130 may generate input data to control the operation of the mobile terminal 100. The user input unit 130 may include a keypad, a dome switch, a touchpad (e.g., static pressure/capacitance), a jog wheel, or a jog switch. When the touch pad has a layered structure with a display unit 151, this may be referred to as a 'touch screen'.

The sensing unit 140 provides status measurements of various aspects of the mobile terminal 100. For example, the sensing unit 140 may detect an open or closed state of the mobile terminal 100, a change in location of the mobile terminal 100, a presence or absence of user contact with the mobile terminal 100, the orientation of the mobile terminal 100, or acceleration/deceleration of the mobile terminal 100, to generate a sensing signal for controlling the operation of the mobile terminal 100. For example, when the mobile terminal 100 is a slide-type mobile terminal, the sensing unit 140 may sense whether a sliding portion of the mobile terminal is open or closed. Other examples include the sensing unit 140 sensing the presence or absence of power provided by the power supply 190 or the presence or absence of a coupling or other connection between the interface unit 170 and an external device. Moreover, the sensing unit 140 may include a proximity sensor 141.

The output unit 150 is configured to output an audio signal, a video signal or an alarm signal. The output unit 150 may include a display unit 151, an audio output module 152, an alarm unit 153 and a haptic module 154.

The display unit 151 may display or output information processed in the mobile terminal 100. For example, when the mobile terminal is in a phone call mode, the display unit 151 may display a User Interface (UI) or a Graphic User Interface (GUI) that includes information associated with the call. When the mobile terminal is in a video call mode or an image capturing mode, the display unit 151 may additionally or alternatively display images captured and/or received, a UI, or a GUI.

The display unit 151 may include at least one of a Liquid Crystal Display (LCD), a Thin Film Transistor-Liquid Crystal Display (TFT-LCD), an Organic Light-Emitting Diode (OLED), a flexible display or a three-dimensional (3D) display. The display unit 151 may be configured with a transparent display to allow viewing of the exterior of the mobile terminal 100 through the display unit, which may be called a transparent display. A representative example of the transparent display may include a Transparent Organic Light Emitting Diode (TOLED). The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented to include two or more displays according to a configured aspect of the mobile terminal 100. For example, a plurality of the display units may be arranged on one surface of the mobile terminal 100 and spaced apart or integrated with each other, or may be arranged on different surfaces of the mobile terminal.

If the display unit 151 and a touch sensitive sensor (referred to as a touch sensor) are formed as a layered structure, the structure may be referred to as a touch screen. The display unit 151 having the touch screen configuration may be used as both an input device and an output device. The touch sensor may be implemented as a touch film, a touch sheet, or a touch pad.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals and transmits corresponding data to the controller 180. Accordingly, the controller 180 may sense which region of the display unit 151 has been touched.

With further reference to FIG. 1, a proximity sensor 141 may be arranged at an inner region of the mobile terminal covered by the touch screen or near the touch screen. The proximity sensor 141 is a sensor configured to sense presence or absence of an object approaching toward a surface to be sensed, or an object positioned near a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor or an infrared ray proximity sensor. When the touch screen is implemented as a capacitance type touch screen, proximity of a pointer to the touch screen is sensed by changes of an electromagnetic field. Accordingly, the touch screen (touch sensor) may be categorized as a proximity sensor.

Hereinafter, for the sake of convenience, a condition where the pointer is positioned proximate the touch screen without contacting the touch screen will be referred to as a 'proximity touch', whereas a situation where the pointer substantially contacts the touch screen will be referred to as a 'contact touch'. The position of the pointer corresponding to the proximity touch on the touch screen corresponds to a position at which the pointer is perpendicular to the touch screen during the proximity touch of the pointer.

The proximity sensor 141 senses proximity touch and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode or a broadcast reception mode. The audio output module 152 may output audio signals relating to functions performed in the mobile terminal 100, such as sounding an alarm when a call is received or a message is received. The audio output module 152 may include a receiver, a speaker, or a buzzer.

The alarm unit 153 outputs signals notifying occurrence of events in the mobile terminal 100. The events may include a call received, a message received, a key signal input or a touch input. The alarm unit 153 may output not only video or audio signals, but also other types of signals, such as signals notifying the occurrence of events, via a vibration. For example, the alarm unit 153 may be configured to vibrate responsive to the mobile terminal receiving a call or message. As another example, when a key signal has been input, the alarm unit 153 may output vibration as a feedback of the key signal input. A user may recognize the occurrence of an event via the vibration output. A signal indicating the occurrence of an event may be output via the display unit 151 or the audio output module 152.

The haptic module 154 generates various tactile effects that a user can feel, such as vibration. Vibration generated via the haptic module 154 may have a controllable intensity, a controllable pattern, or other controllable features. For example, different vibration may be output in a synthesized manner or in a sequential manner.

The haptic module 154 may generate various tactile effects, including not only vibration, but also arrangement of pins moving vertically with respect to a skin being touched (contacted), air injection force or air suction force through an injection hole or a suction hole, touch by a skin surface, presence or absence of contact with an electrode, effects by stimulus such as an electrostatic force, or reproduction of a cold or hot feeling using a heat absorbing device or a heat emitting device.

The haptic module 154 may be configured to transmit tactile effects (signals) through a user's direct contact or a user's muscular sense using a finger or a hand. The haptic module 154 may be implemented to include two or more devices according to the configuration of the mobile terminal 100.

The memory 160 may store a program for the processing and controlling of the controller 180. Alternatively, the memory 160 may temporarily store input/output data (e.g., phonebook data, messages, still images, video, etc.). The memory 160 may also store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, or optical disk. Also, the mobile terminal 100 may operate a web storage that performs the storage function of the memory 160 on the Internet.

The interface unit 170 may generally be implemented to interface the mobile terminal with external devices. The interface unit 170 may allow data reception from an external device, power delivery to each component in the mobile terminal 100, or data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, or earphone ports.

The interface unit 170 may include an identification module 171 configured as a chip for storing various information required to authenticate an authority to use the mobile terminal 100. The identification module 171 may include a User Identity Module (UIM), a Subscriber Identity Module (SIM), or a Universal Subscriber Identity Module (USIM). The identification module (hereinafter, referred to as 'identification device') may be implemented in a type of smart card. Hence, the identification device may be coupled to the mobile terminal 100 via a port.

The interface unit 170 may serve as a path for power to be supplied from an external cradle to the mobile terminal 100, when the mobile terminal 100 is connected to the external cradle, or as a path for transferring various command signals input from the cradle by a user to the mobile terminal 100. Such various command signals or power input from the cradle may operate as signals for recognizing that the mobile terminal 100 has been mounted to the cradle accurately.

The controller 180 typically controls the overall operations of the mobile terminal 100. For example, the controller 180 performs the controlling and processing associated with telephony calls, data communications, and video calls. The controller 180 may include a multimedia module 181 which provides multimedia playback. The multimedia module 181 may be configured as part of the controller 180 or as a separate component. The controller 180 can perform pattern recognition processing for recognizing writing or drawing input on the touch screen as text or as an image.

The power supply unit 190 provides power required by various components of the mobile terminal. The power supply unit operates under the control of the controller 180. The provided power may be internal power, external power, or a combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, or other electronic units designed to perform the functions described herein, or a selective combination thereof. In some cases, such embodiments are implemented by the controller 180.

For software implementation, procedures and functions may be implemented together with separate software modules, each of which performs at least one function or operation. The software codes can be implemented with a software application written in any suitable programming language. The software codes may be stored in the memory 160 and executed by the controller 180.

Figure 2A:
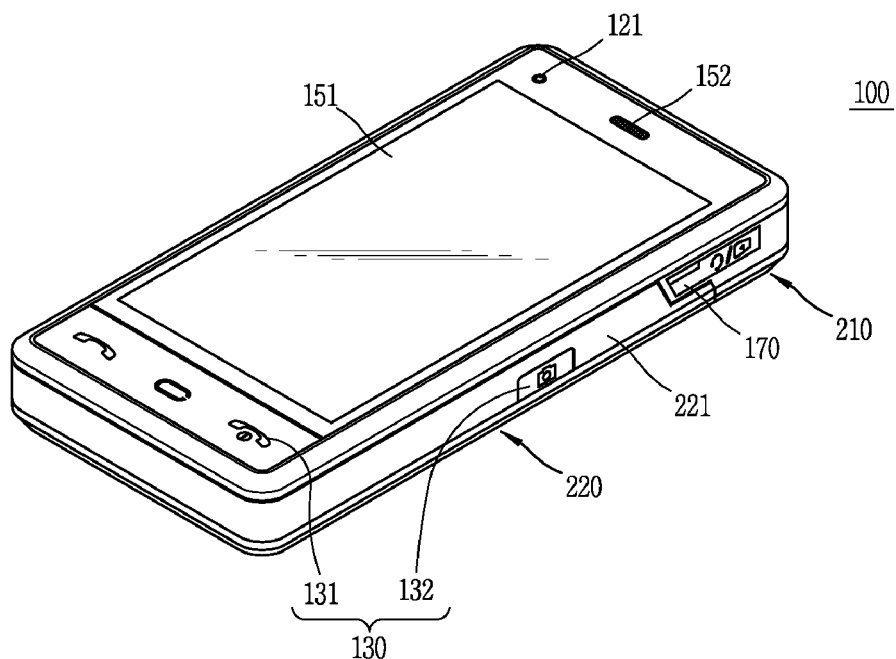
FIGS. 2A and 2B are front perspective views of the mobile terminal in accordance with the present invention.
Figure 2B:
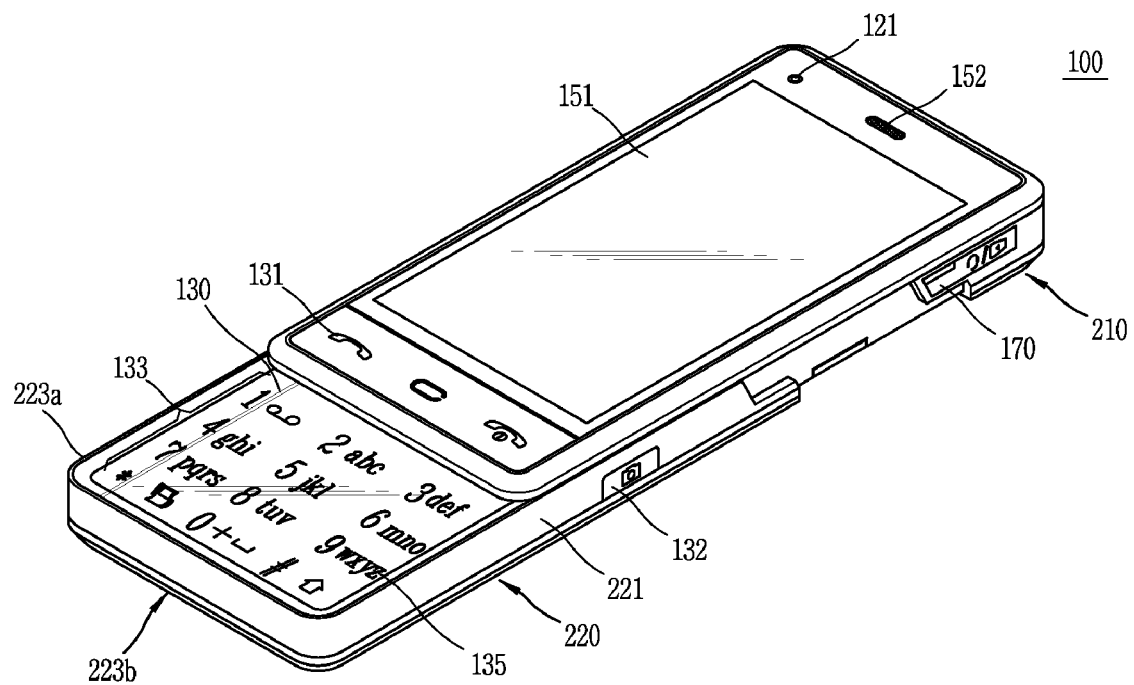

FIGS. 2A and 2B are front perspective views of the mobile terminal in accordance with the present invention. As shown in FIGS. 2A and 2B, the mobile terminal 100 has a first body 210 and a second body 220 that are slidably coupled to each other. However, the present invention is not limited a sliding type mobile terminal, but may be applied to other mobile terminal designs that are well known in the art in which two or more bodies are combined with each other in a relatively movable manner, such as a folder type mobile terminal, a swing type mobile terminal or a swivel type mobile terminal.

When an exposable part of the second body 220 of the mobile terminal 100 is exposed to a front side of the mobile terminal, the mobile terminal is in an 'open state' (FIG. 2B). When the exposable part of the second body 220 is covered by the first body 210, the mobile terminal is in a 'closed state' (FIG. 2A).

Figure 4A:
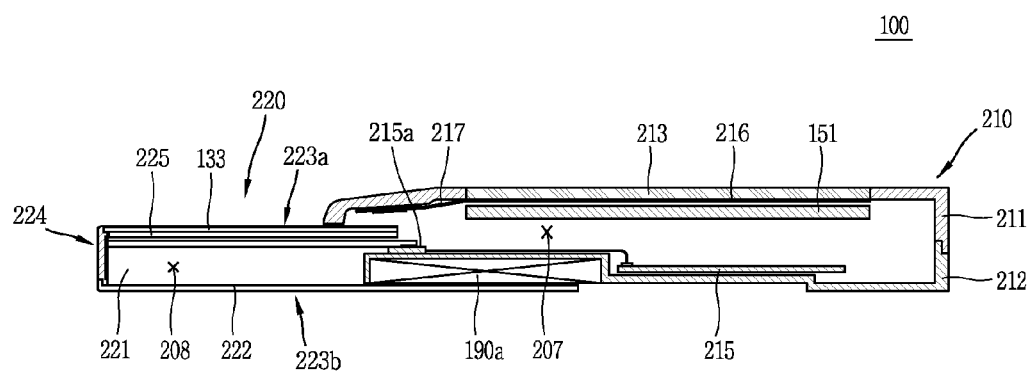
FIGS. 4A and 4B are sectional views showing an open state and a closed state of the mobile terminal of FIG. 3 in accordance with the present invention.
Figure 4B:
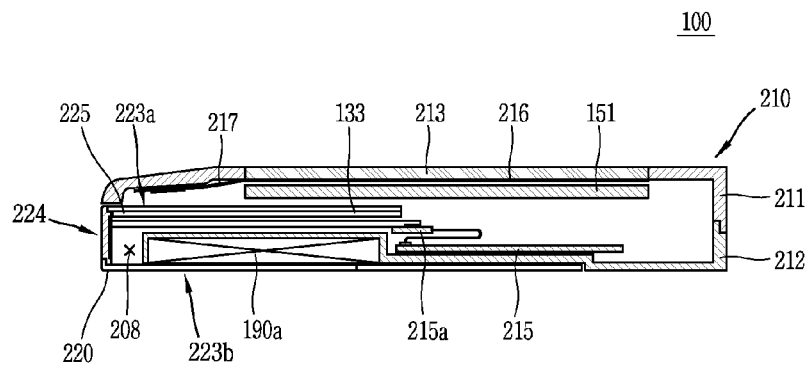

The mobile terminal 100 may alternatively be a bar type mobile terminal with the first body 210 and the second body 220 overlapping each other. For example, as shown in FIGS. 4A and 4B, the first body 210 and the second body 220 are each formed to have a rectangular-shaped section and are arranged to face each other. The bar type mobile terminal 100 may allow an implementation of a form capable of minimizing the occurrence of a step height between a front surface portion of the first body 210 and a front surface portion of the second body 220, or a step height between a rear surface portion of the first body 210 and a rear surface portion of the second body 220, in comparison to a mobile terminal having two or more relatively movable bodies in an open state.

The mobile terminal 100 is operated in a standby mode when the mobile terminal is in a closed state. However, the mobile terminal 100 may be released from the standby mode via a user's manipulation. When the mobile terminal 100 is in an opened state, the mobile terminal may be operated in a call mode or an edition mode. The call mode or the edition mode may be switched to the standby mode via a user's manipulation or after a lapse of a predetermined time.

A case (casing, housing, cover, etc.) that forms an outer appearance of the first body 210 may be formed of multiple pieces. Various electronic components are mounted at an inner space of the case. The case may be formed, for example, by injection-molding a synthetic resin or formed of a metallic material such as stainless steel (STS), titanium (Ti), or other appropriate metallic material.

A display unit 151, the audio output module 152, the camera 121, the user input unit 130 (e.g., 131), and the interface unit 170 may be arranged on the first body 210 of the mobile terminal 100. The display unit 151 may be implemented as a touch screen for inputting information via a touch. The display unit 151 may be formed to have a size corresponding to a front surface portion of the first body 210 and may be configured to receive input and perform output therethrough when the mobile terminal 100 is in a closed state. For example, the display unit 151 may output soft keys for receiving input of numbers or characters, or for executing a function via an icon.

The user input unit 130 may be manipulated to receive commands for controlling operations of the mobile terminal 100. The user input unit 130 may be implemented, for example, as touch keys 131 for receiving input commands via touch and push keys 132 for receiving input commands via pressing of the push keys.

The content input via the user input unit 130 may be set in various ways. For example, the touch key 131 may be used to receive a command, such as START, END, or SCROLL, and the push key 132 may be used for receiving a command, such as controlling a volume level being output from the audio output unit 152, or switching the display unit 151 to a touch recognition mode.

The second body 220 may be formed of a transmissive material. A touch keypad 133 may be provided on a front surface portion of the second body 220 and exposed to the outside when the mobile terminal 100 is in an open state. The touch keypad 133 may include a plurality of numbers, characters or symbols 135. The numbers, characters or symbols 135 may be formed, for example, by printing or imprinting and may be configured to be illuminated.

The push key 132 may be mounted to a side surface of the second body 220. The side surface of the second body 220 may be formed of a non-transmissive material so that a dome switch inside the mobile terminal 100 cannot be viewed from outside the mobile terminal.

Figure 3:
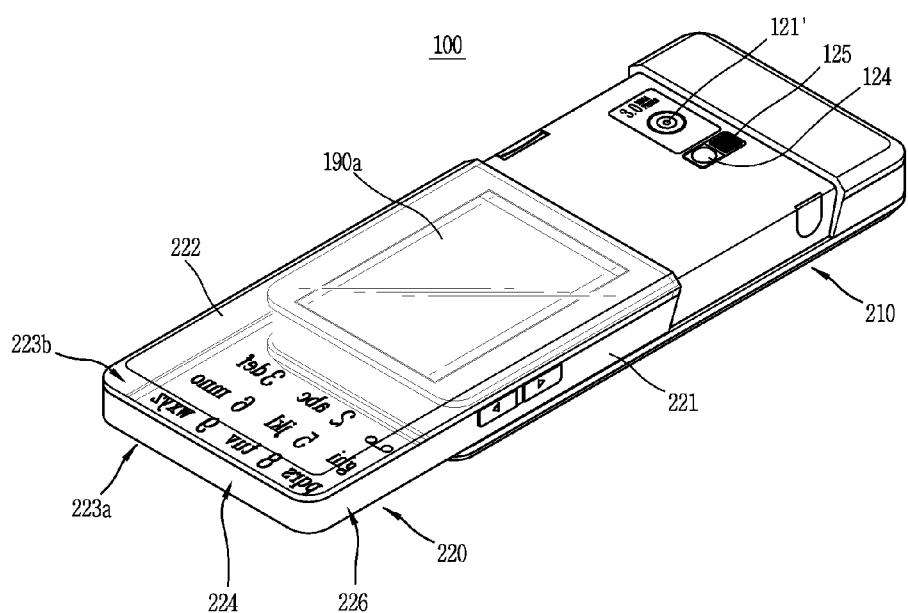
FIG. 3 is a rear perspective view of the mobile terminal of FIGS. 2A and 2B in accordance with the present invention.

FIG. 3 is a rear perspective view of the mobile terminal 100 of FIGS. 2A and 2B in accordance with the present invention with the mobile terminal displayed in an open state. Referring to FIG. 3, a camera 121' may be mounted on a rear surface portion of the first body 210. The camera 121' faces a direction that is substantially opposite to the direction faced by the camera 121 (FIG. 2A), and may have a different resolution than the camera 121.

For example, the camera 121 may operate with a relatively lower number of pixels (lower resolution) to facilitate the user capturing an image of his or her own face to send to another party during a video call. The camera 121' may operate with a relatively higher number pixels (higher resolution) to facilitate the capturing of a higher quality image of a general object that is not immediately sent to another party. The cameras 121 and 121' may be provided in the first body 210 in a rotatable or pop-up manner.

A flash 125 and a mirror 124 may be located next to the camera 121'. The flash 125 operates in conjunction with the camera 121' and illuminates an object when capturing an image of the object with the camera 121'. The mirror 124 allows the user to see a reflection of his or her own face when capturing an image of himself or herself (in a self-portrait mode) by using the camera 121'.

The power supply unit 190 (FIG. 1) for supplying power to the mobile terminal 100 may be mounted on the first body 210. The power supply unit 190 includes a battery 190a detachable from the outside of the first body 210.

The second body 220 includes a slide portion 221 slidably coupled to the first body 210, and a cover 222 coupled to the slide portion 221 and formed to be slidably movable along a rear surface portion of the first body 210. The cover 222 of the second body 220 is configured to be opened for detachably mounting the battery 190a to the first body 210.

Hereinafter, the mobile terminal 100 will be explained based on the configuration of the second body 220 including the slide portion 221 and the cover 222. However, the present invention is not limited to such a configuration. For example, the slide portion 221 may be defined as the second body 220, and the cover 222 may be an additional component mounted to the second body 220 and defined as the slide portion 221.

The second body 220 includes a front surface portion 223a, a rear surface portion 223b positioned opposite the front surface portion, a first end surface portion 224 and a first side surface portion 226. The front surface portion 223a and the rear surface portion 223b are formed to be spaced from each other and to be parallel with each other. The first end surface portion 224 and the first side surface portion 226 are each formed in a direction transverse to the front surface portion 223a and the rear surface portion 223b.

The first end surface portion 224 connects the front surface portion 223a and the rear surface portion 223b to each other, and is arranged in a widthwise direction of the mobile terminal. The first side surface portion 226 also connects the front surface portion 223a and the rear surface portion 223b to each other, is formed in a direction transverse to the first end surface portion 224, and is arranged in a lengthwise direction of the mobile terminal.

The display unit 151 for displaying visual information, or alternatively the user input unit 130 (FIG. 1) for receiving a control command, may be formed on the front surface portion 223a. The display unit 151 or the user input unit 130 is configured to transmit light through the front surface portion 223a.

The touch keypad 133 (see FIG. 2B) is implemented as one example of the user input unit 130. Referring to the FIG. 2B, the touch keypad 133 forms the appearance of the second body 220 and is formed of a transmissive material. More particularly, the touch keypad 133 may be a transmissive case of the second body 220.

Referring again to FIG. 3, the rear surface portion 223b may be a main surface of the cover 222 and be formed of a transmissive material. More particularly, the rear surface portion 223b forms a transmissive region of the second body 220 together with the front surface portion 223a when the mobile terminal is in an open state.

FIGS. 4A and 4B are sectional views showing an open state and a closed state of the mobile terminal 100 of FIG. 3 in accordance with the present invention. The first body 210 may include a front casing 211 and a rear casing 212 coupled to each other, and a slide hole 207 for accommodating the slide portion 221 of the second body 220 therein is formed in the first body 210 in a lengthwise direction. Accordingly, the slide portion 221 is accommodated in the slide hole 207 when the mobile terminal 100 is in a closed state so that the slide portion 221 is not visible from outside the mobile terminal.

A display module 151, a main board 215 (printed circuit board), a supplementary board 215a and a battery 190a are mounted in the first body 210. The main board 215 is arranged to be covered by the front surface portion 223a of the second body 220 when the mobile terminal is in a closed state. The display module 151, the battery 190a, and the a main board 215 may be arranged to either partially or totally overlap one another. For example, the display module 151 may be positioned at one side of the slide hole 207, and the battery 190a and the main board 215 may be mounted to another side of the slide hole 207. The battery 190a and the main board 215 are arranged in a lengthwise direction of the first body 210. The main board 215 is connected to the supplementary board 215a and constitutes the controller 180 (FIG. 1) for processing a control command.

A transmissive region 213 is formed on the front casing 211, and the display module 151 is positioned at a rear side of the transmissive region 213. A touch film 216 for sensing touch may be attached to a rear surface portion of the transmissive region 213. A flexible printed circuit board (FPCB) 217 configured to electrically couple the touch film 216 to the main board 215, and having a touch sensor for sensing touch applied to the touch key 131 (FIGS. 2A and 2B) is connected to the touch film 216.

The touch keypad 133 is coupled to the slide portion 221, and is configured to be accommodated in the first body 210 when the mobile terminal 100 is in the closed state (FIG. 4B) and to be retractable from the first body 210 when the mobile terminal 100 is in the opened state (FIG. 4A). The numbers, characters or symbols 135 may be formed on a surface of the touch keypad 133 by imprinting, printing, or by other methods known in the art. Alternatively, the numbers, characters or symbols 135 may be outputs of a transmissive display device such as liquid crystal, transparent organic LED (TOLED), or e-paper.

A touch sensor 225 for sensing touch applied to the touch keypad 133 may be positioned at a rear surface portion of the touch keypad 133. The touch sensor 225 may be implemented as a conductive film formed of a transmissive material, such as, for example, an Indium Tin Oxide (ITO) film. The touch sensor 225 is electrically coupled to at least the main board 215 or the supplementary board 215a and facilitates the processing of a control command via touch sensing.

The touch sensor 225 is positioned between the supplementary board 215a and the first end surface portion 224. A space 208 is formed between the touch sensor 225 and the rear surface portion 223b. As shown, the cover 222 may form the rear surface portion 223b, and the space 208 may be formed between the touch keypad 133 and the cover 222. When the mobile terminal 100 is in a closed state, a portion of the first body 210 in which the battery 190a is housed may be accommodated in the space 208.

As shown in FIG. 4A, the space 208 is empty when the mobile terminal 100 is in an open state. Accordingly, an object positioned at the rear side of the mobile terminal 100 can be viewed through the touch keypad 133 and the cover 222, which are each formed of a transmissive material. Accordingly, the touch keypad 133 and the cover may be completely transparent or semi-transparent. Further, the touch keypad 133 and the touch sensor 225 form a transmissive portion of the user input unit 130.

A light transmission unit is formed by the space 208, a portion of the front surface portion 223a corresponding to the space 208, and a portion of the rear surface portion 223b corresponding to the space 208. The light transmission unit is configured to allow light shining through the front surface portion 223a to also pass through the rear surface portion 223b. The light transmission unit is covered by the first body 210 when the mobile terminal 100 is in a closed state. The light transmission unit may also be configured to allow light shining through the rear surface portion 223b to pass through the front surface portion 223a.

As shown in FIG. 4B, the space 208 is partially filled with components when the mobile terminal 100 is in the closed state. Accordingly, the supplementary board 215a and the battery 190a may be spaced away from the first end surface portion 224.

In an embodiment of the invention, a transparent display may be positioned at a rear surface portion of the touch keypad 133. The numbers, characters or symbols 135 may be displayed by the transparent display, and the touch keypad 133 and the touch sensor 225 may be implemented as both the user input unit 130 and the display unit 151 (FIG. 1).

Figure 5:
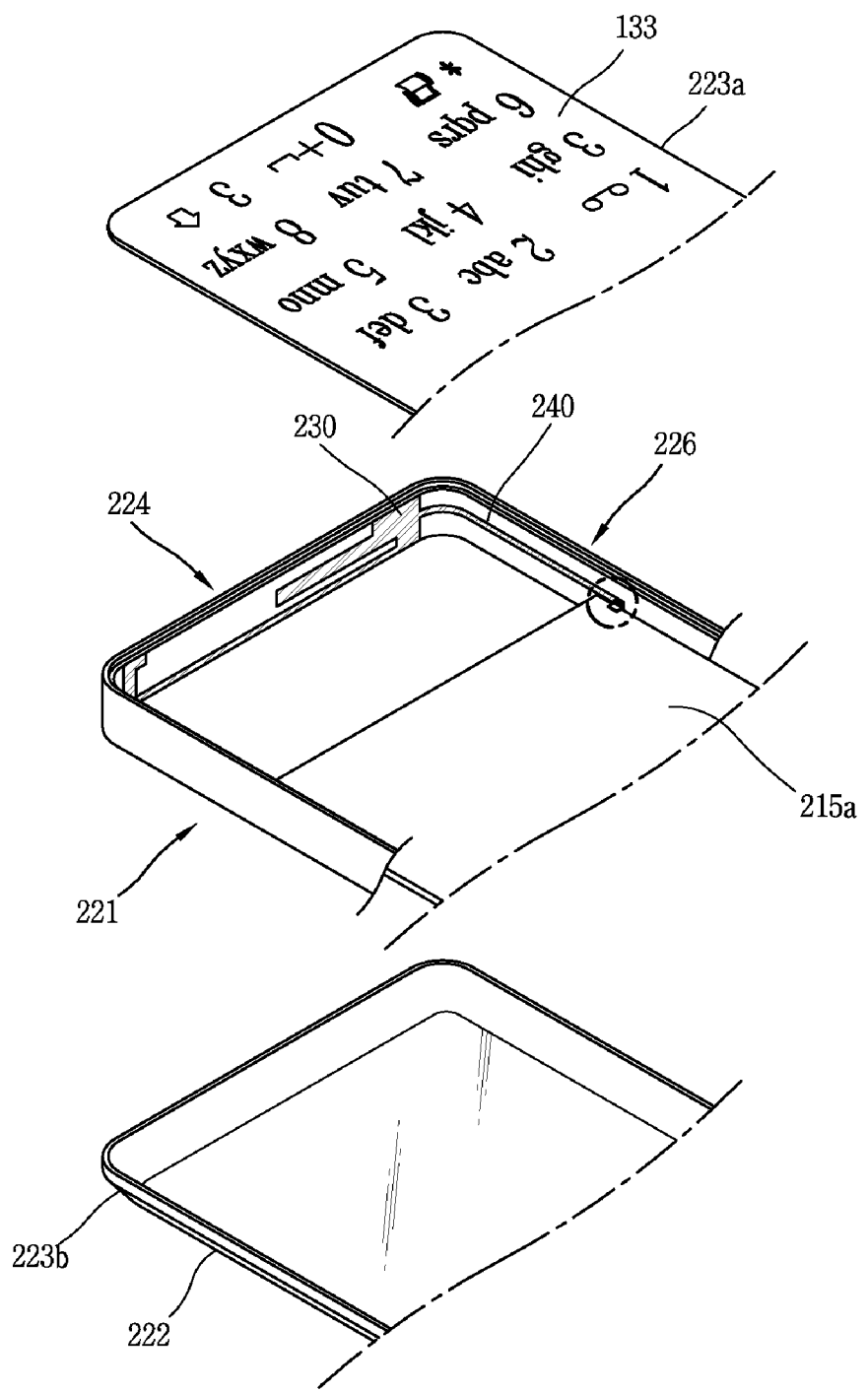
FIG. 5 is a disassembled view depicting an antenna of the mobile terminal of FIG. 3.
Figure 6A:
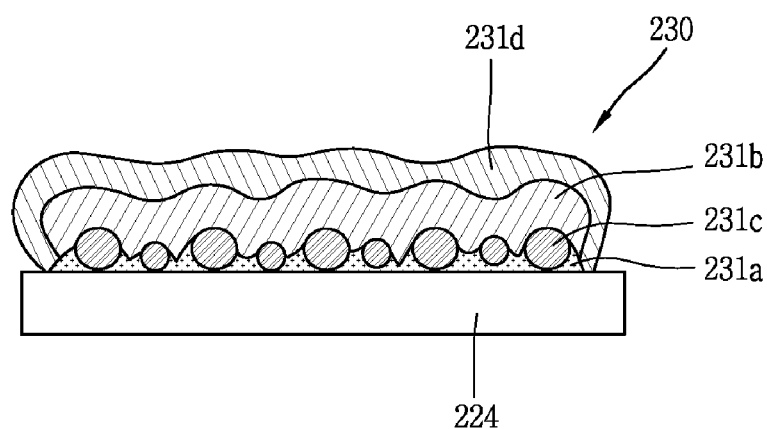
FIG. 6A is a section view of an antenna of the mobile terminal of FIG. 5 in accordance with the present invention.

Hereinafter, an antenna pattern 230 (FIG. 5) formed in relation to the slide portion 221 will be explained in more detail. FIG. 5 is a disassembled view of the mobile terminal of FIG. 3, and FIGS. 6A and 6B are enlargement views of the first end surface portion 224 and the first side surface portion 226 of FIG. 5, respectively.

Figure 6B:
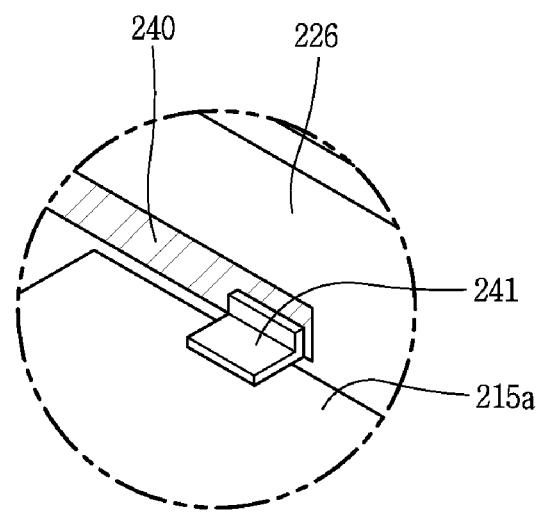
FIG. 6B is a perspective view of a portion of a feeding portion of the antenna of FIG. 6A.

Referring to FIGS. 5-6B, the antenna pattern 230 (FIG. 5) is positioned on the first end surface portion 224 of the second body 220 and does not to overlap the display unit 151 (FIG. 2B) or the user input unit 130 (FIG. 2B), or more specifically the touch keypad 133. The main board 215 (FIG. 4A) is electrically coupled to the antenna pattern 230, either directly of via the supplementary board 215a, and processes a wireless signal transmitted or received by the antenna pattern. By having the antenna pattern 230 positioned on the first end surface 224, the antenna device is positioned in the transmissive region but is not visible from outside the mobile terminal.

The antenna pattern 230 is formed at a surface that is transverse to the front surface portion 223a (FIG. 4A) of the second body 220 (FIG. 4A). The antenna pattern 230 is positioned spaced from the display unit 151 (FIG. 4A) and from the user input unit 130 (FIG. 2B), such as the touch keypad 133. More specifically, the antenna pattern 230 is formed on the first end surface portion 224 and includes a plurality of layers. Referring to FIG. 6A, the antenna pattern 230 includes a first layer 231a and a second layer 231b.

The first layer 231a of the antenna pattern 230 is printed on an inner surface of the first end surface portion 224, forming a print layer on the first end surface portion. The first layer 231a of the antenna pattern 230 contains conductors 231c to facilitate plating on the first end surface portion 224. The first end surface portion 224 is formed of a non-conductive material, such as synthetic resin, and the first layer 231a of the antenna pattern 230 is formed with the conductors 231c to be plated with a non-conductive material.

The first layer 231a of the antenna pattern 230 may be printed on an inner surface of the case of the slide portion 221 (FIG. 4A) in a preset pattern or in a specific pattern with ink that contains the conductors 231c. The conductors 231c may be formed of copper (Cu), silver (Ag), or other suitable conductive materials, and the printing may be a pad printing, a spray printing, or other suitable type of printing.

The conductors 231c may be positioned spaced from each other differently in a lengthwise direction than in a thickness direction. Accordingly, the first layer 231a may be conductive in the thickness direction, but non-conductive in the lengthwise direction. Interference of the first layer 231a due to transmission and reception of a radio signal of the second layer 231b may be attenuated. The first layer 231a may include binder resin for adhering the conductors 231c onto at least an inner or an outer surface of the first end surface portion 224. Alternatively, the first layer 231a may be formed by using conductive ink.

The second layer 231b of the antenna pattern 230 is formed of a conductive material and is plated onto the first layer 231a. The second layer 231b is configured to transmit and receive a wireless signal. The second layer 231b has a radiation pattern for transmitting and receiving a wireless signal of a specific frequency band.

The second layer 231b may be implemented as a plated layer formed by electrodeless plating, and may be plated in accordance with a pattern of the first layer 231a. More particularly, the second layer 231b may be plated by chemical plating or electroplating. The second layer 231b may be formed of a single metallic material, such as copper (Cu).

A protection layer 231d for protecting the second layer 231b is plated on the second layer 231b. The protection layer 231d may be formed by nickel plating.

Since the antenna pattern 230 is formed on the case, a transmission/reception function of the antenna is enhanced and a slimmer antenna structure is implemented. A three-dimensional shaped antenna may also be shaped by utilizing a side wall of the case.

With continued reference to FIGS. 5 and 6B, a feeding portion 240 configured to electrically couple the second layer 231b to the main board 215 (FIG. 4A), such as via the supplemental board 215a, is positioned on the first side surface portion 226. The feeding portion 240 may be mounted, printed or plated on one surface of the first side surface portion 226.

The feeding portion 240 has one end coupled to the second layer 231b, and another end protruding from the first side surface portion 226 toward the supplemental board 215a. For example, a connection terminal 241 may protrude from the first side surface portion 226. A feeding path for the antenna pattern 230 formed by the second layer 231b is implemented as the connection terminal 241 and contacts the supplementary board 215a. In this configuration, the antenna pattern 230 may be a monopole antenna. However, the present invention is not limited to this. For example, the antenna pattern 230 may be implemented as a dipole antenna, a planar inverted F antenna, or other type of antenna well known in the art. depending on the type of connection between the feeding portion 240 and the main board 215 or the supplementary board 215a, or by changes of a pattern of the second layer 231b.

Figure 7:
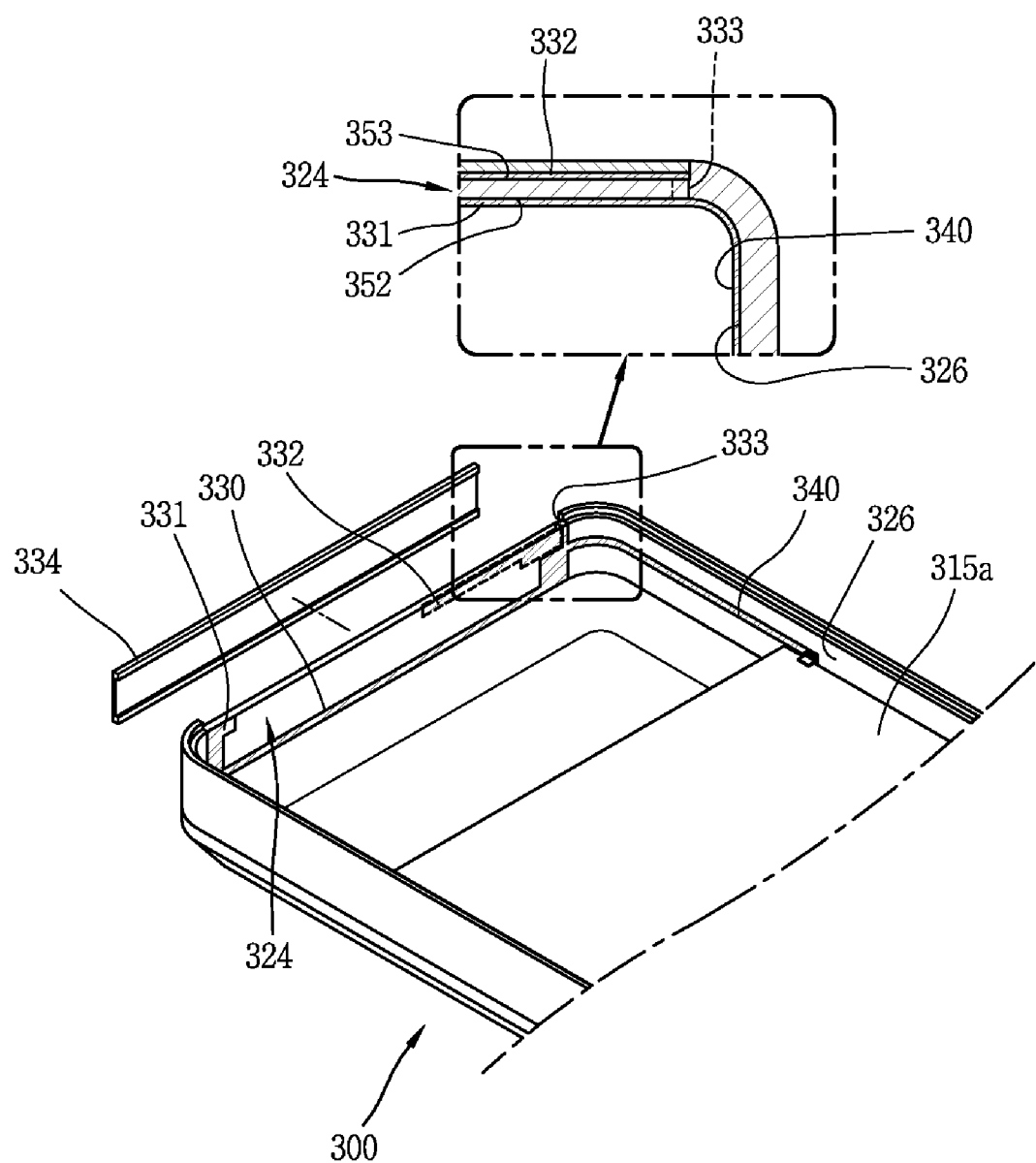
FIG. 7 is a disassembled view of a portion of a mobile terminal according to an embodiment of the present invention.

FIG. 7 is a disassembled view of a mobile terminal 300 according to an embodiment of the present invention. Referring to FIG. 7, an antenna pattern 330 includes a first antenna pattern 331 and a second antenna pattern 332.

Each of the first antenna pattern 331 and the second antenna pattern 332 is coupled to a main board (not shown), such as via a supplemental board 315a. The first antenna pattern 331 is configured to transmit and receive radio electromagnetic signals of a first frequency band and the second antenna pattern 332 is configured to transmit and receive radio electromagnetic signals of a second frequency band that is different from the first frequency band. One of the first frequency band and the second frequency band may be higher than the other of the first frequency band and the second frequency band.

For example, the first frequency band may have a frequency of less than 1000 Mhz, such as a frequency of 800 Mhz~1000 Mhz. The second frequency band may be a frequency band allocated to a Global System for Mobile communication (GSM) scheme and may have a frequency of more than 1600 Mhz, such as a frequency of 1600 Mhz~2200 Mhz. The first frequency band may be a frequency band allocated to a Personal Communication Services (PCS) scheme and a Wideband Code Division Multiple Access (WCDMA) scheme.

The first antenna pattern 331 is formed on one surface of a first end surface portion 324 of the body of the mobile terminal 300, and the second antenna pattern 332 is formed on another surface of the first end surface portion 324 that is opposite the surface on which the first antenna pattern is formed. More particularly, the first end surface portion 324 includes an inner side surface 352 and an outer side surface 353 in a thickness direction. The first antenna pattern 331 is formed on the inner side surface 352 and the second antenna pattern 332 is formed on the outer side surface 353.

The first antenna pattern 331 and the second antenna pattern 332 are electrically coupled to each other via a connection path 333. The connection path 333 is formed at an end of the first end surface portion 324. The end of the first end surface 324 connects with the inner side surface 352 and the outer side surface 353 of the first end surface portion 324. However, the present invention is not limited to this. For example, the first antenna pattern 331 and the second antenna pattern 332 may be electrically coupled to each other by via holes, pogo pins, or other known methods that penetrate the first end surface portion 324.

The first antenna pattern 331 and the second antenna pattern 332 are electrically coupled to a supplementary board 315a via a feeding portion 340 formed on a first side surface portion 326 of the body of the mobile terminal 300. By forming the first antenna pattern 331 and the second antenna pattern 332 on separate surfaces of the first end surface portion 324 of the body of the mobile terminal 300, an antenna device capable of transmitting and receiving wireless signals of a multi-frequency band can occupy a slimmer space.

A cover member 334 may be mounted to the first end surface portion 324. The cover member 334 is configured to cover the second antenna pattern 332 formed on the outer side surface 353. A film, a tape, or other suitable covering for covering the first antenna pattern 331 may be coupled to the inner side surface 352 of the first end surface portion 324 to prevent the first antenna pattern 331 from being visible from outside the mobile terminal 300.

Figure 8:
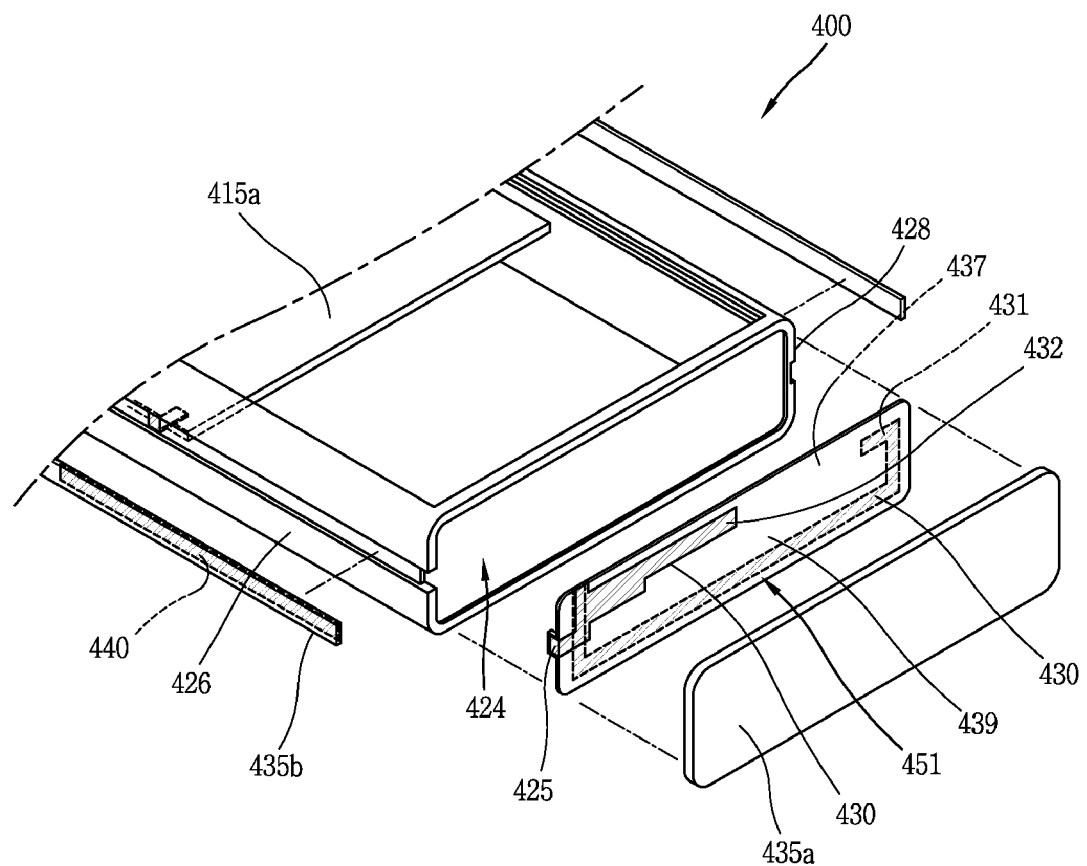
FIG. 8 is a disassembled view of a portion of a mobile terminal according to an embodiment of the present invention.

FIG. 8 is a disassembled view of a mobile terminal 400 according to an embodiment of the present invention. A body of the mobile terminal 400 consists of a transmissive case 428, a first cover member 435a and a second cover member 435b. The first cover member 435a forms an appearance of the body and is mounted to the case 428 at a first end surface portion 424 of the body of the mobile terminal 400. The second cover member 435b also forms an appearance of the body and is mounted to the case 428 at a first side surface portion 426 of the body of the mobile terminal 400. The first cover member 435a and the second cover member 435b are positioned transverse to each other.

A plate 451 is positioned between the first cover member 435a and a portion of the case 428 corresponding to the first end surface portion 424 of the body of the mobile terminal 400. An antenna pattern 430 is formed on the plate 451, and the first cover member 435a is configured to cover the antenna pattern 430. A first antenna pattern 431 of the antenna pattern 430 may be formed on a first surface 437 of the plate 451 and a second antenna pattern 432 of the antenna pattern 430 may be formed on a second surface 439 of the plate 451. The antenna pattern 430 of FIG. 8 may be the same or similar to the antenna patterns 230, 330 shown in FIGS. 5, 6A and 7. However, the present invention is not limited to this. For example, the antenna pattern 430 may be implemented as a thin metallic body mounted to a case.

A feeding portion 440 is formed on the second cover member 435b. The feeding portion 440 electrically couples the antenna pattern 430 to a supplementary board 415a. The feeding portion 440 is mounted or plated to an inner surface of the second cover member 435b not to be exposed to the outside.

The feeding portion 440 is configured be electrically coupled to the first antenna pattern 431 and to the second antenna pattern 432. For example, a conductive connection terminal 425 may be mounted to an end of the antenna pattern 430. The conductive connection terminal 425 is configured to contact the feeding portion 440 when the first cover member 435a and the second cover member 435b are mounted to the case.

The structures described above are implemented as slim antenna devices positioned within a transmissive region of a mobile terminal 400. However, the antenna devices are not visually exposed to the outside of the mobile terminal 400.

Figure 9A:
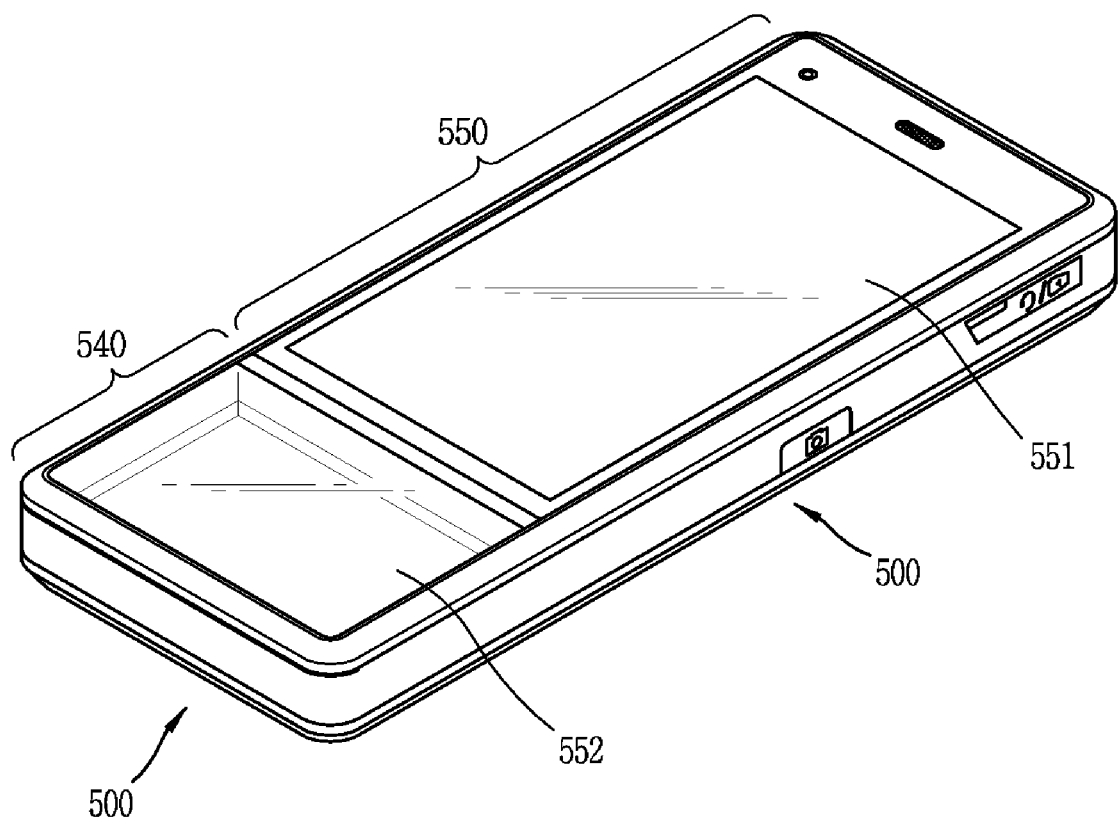
FIG. 9A is a perspective view of a mobile terminal according to an embodiment of the present invention.
Figure 9B:
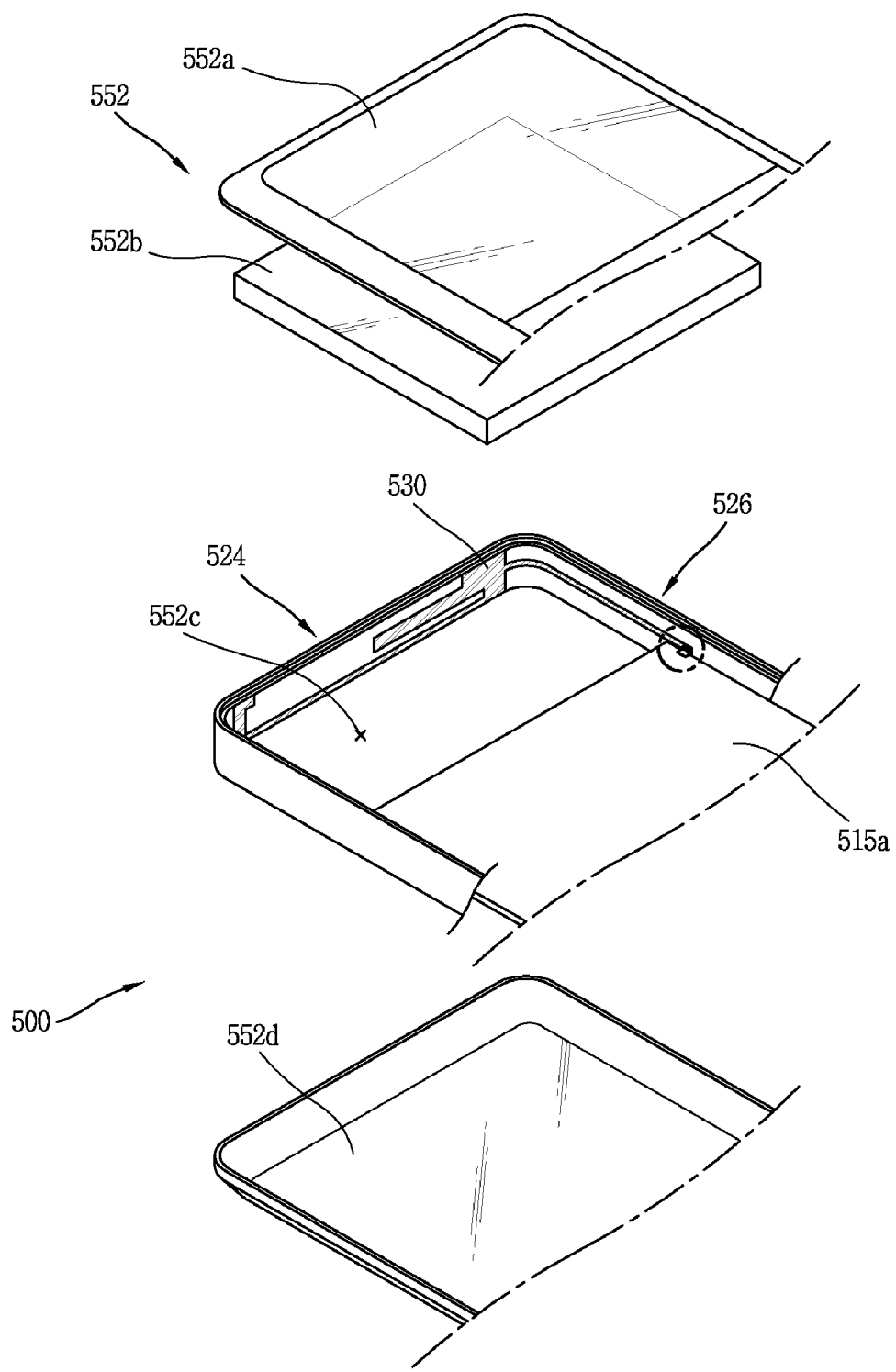
FIG. 9B is a disassembled view of a portion of the mobile terminal of FIG. 9A according to an embodiment of the present invention.

FIG. 9A is a perspective view of a mobile terminal 500 according to an embodiment of the present invention. FIG. 9B is a disassembled view of a transmissive region 540 of the mobile terminal 500 of FIG. 9A.

Referring to FIGS. 9A and 9B, the mobile terminal 500 may be a bar-type mobile terminal having a single body. However, the present invention is not limited to this. For example, the present invention may be applicable to various structures where at least two bodies are coupled to each other to perform a relative motion, such as a slide type mobile terminal, a folder type mobile terminal, a swing type mobile terminal, or a swivel type mobile terminal.

Referring to FIG. 9A, a body of the mobile terminal 500 includes a non-transmissive region 550 and a transmissive region 540. The transmissive region 540 refers to a transparent region that can be visually seen through. More specifically, an object positioned at a rear side of the body of the mobile terminal 500 can be visually seen from the front side of the mobile terminal through the transmissive region 540. Conversely, the non-transmissive region 550 is a nontransparent or opaque region that cannot be visually seen through.

A main display unit 551 is positioned at the non-transmissive region 550. The main display unit 551 is configured to display visual information via an opaque display.

A supplementary display unit 552 configured to display visual information is positioned at the transmissive region 540. The supplementary display unit 552 is configured as a transmissive display unit.

Referring to FIG. 9B, the display unit 552 includes a window 552a and a transparent display 552b. The transparent display 552b is covered by the window 552a and displays visual information. The window 552a is transmissive and is mounted to a window hole 552c formed at one surface of the body of the mobile terminal 500. As an example, the transparent display 552b may be a transparent OLED (TOLED).

An antenna pattern 530 may be formed at a first end surface portion 524 or at a first side surface portion 526 of the body of the mobile terminal 500. For example, the antenna pattern 530 may be a specific pattern positioned on the first end surface portion 524 of the body and may be electrically coupled to a circuit board 515a by extending toward the first side surface portion 526. The circuit board 515a processes wireless signals transmitted to or received from the antenna pattern 530 and is arranged at the non-transmissive region 550 (FIG. 9A).

The antenna pattern 530 is formed parallel to a direction in which light penetrates through the body at the transmissive region 540 (FIG. 9A) toward a rear surface portion 552d and is electrically coupled to the circuit board 515a at the non-transmissive region 550 (FIG. 9A). This allows implementation of an antenna device positioned at or near the transmissive region 540 but not visible from outside the mobile terminal 500.

Figure 10:
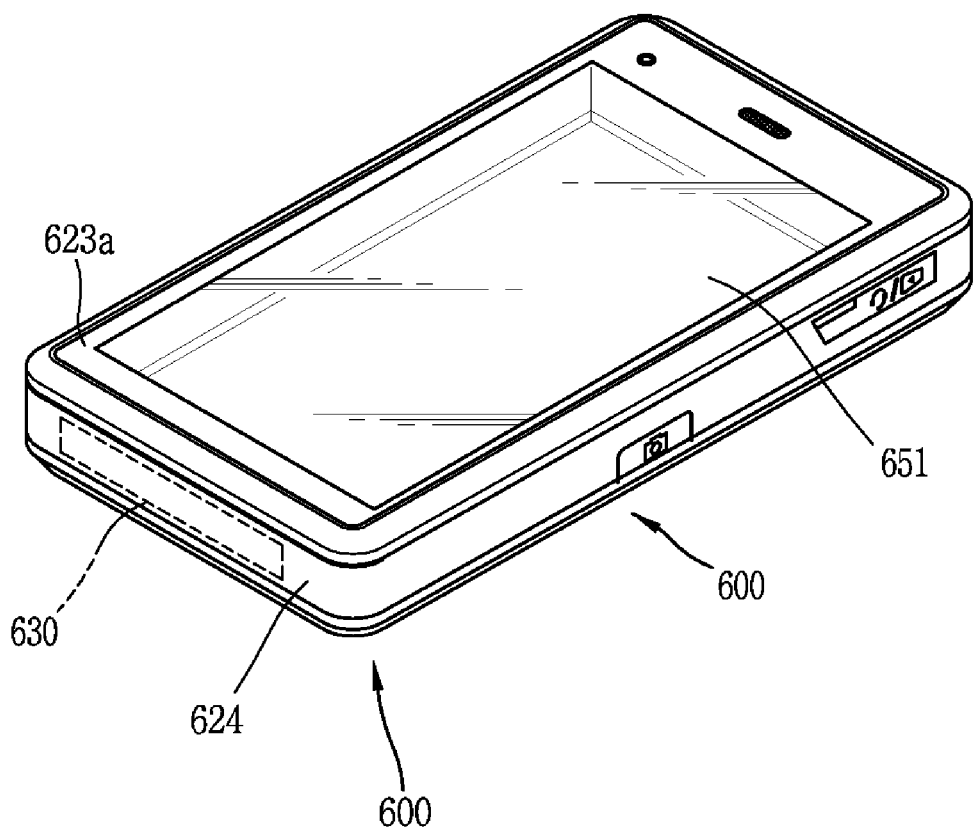
FIG. 10 is a perspective view of a mobile terminal according to an embodiment of the present invention.

FIG. 10 is a perspective view of a mobile terminal 600 according to an embodiment of the present invention. Referring to FIG. 10, most of a main surface, such as a front surface portion 623a, of a body of the mobile terminal 600 is filled with a display unit 651. The display unit 651 is configured to be transmissive.

An antenna pattern 630 is formed at a surface that is transverse to the main surface of the body. More specifically, the antenna pattern 630 is positioned on a first end surface portion 624 of the body. The antenna pattern 630 may have the same or similar structure as the antenna patterns 230, 330, 430 shown in FIGS. 5 to 8. Accordingly, the mobile terminal 600 may have a transmissive body with an antenna pattern 630 that is not visible from outside the mobile terminal 600.

The present invention provides a mobile terminal having a transmissive display unit or user input unit and an antenna pattern formed at a surface transverse to the display unit or the user input unit. This allows the mobile terminal to have an antenna pattern that is not visible from outside the mobile terminal. More particularly, the present invention includes an antenna device positioned at a transmissive region of the mobile terminal but not visible from outside the mobile terminal.

The mobile terminal may include a transmissive case and an antenna pattern formed on an end surface portion of the case. The present invention also includes a mobile terminal capable of transmitting and receiving wireless signals of a multi-frequency band in a slimmer space via an antenna pattern formed on an end surface or a side surface of a body of the mobile terminal via printing and plating.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims. All changes and modifications that fall within the metes and bounds of the claims, or equivalents of such metes and bounds, are intended to be embraced by the appended claims.

What is claimed is:

1. A mobile terminal, comprising:
a body having a front surface, a rear surface positioned opposite the front surface, a first end surface positioned between the front surface and the rear surface at a first end of the body and transverse to the front surface and the rear surface, and a first side surface positioned between the front surface and the rear surface at a first side of the body, wherein the first side surface is transverse to the front surface and the rear surface and extends from the first end surface;
a first display unit positioned on the front surface of the body proximate the first end surface of the body and configured for displaying visual information; and
an antenna positioned proximate the first display unit and configured for at least transmitting or receiving a wireless signal,
wherein the first display unit is a light transmissive display unit, and
wherein the antenna is positioned proximate either the first end surface or the first side surface and away from the first display unit.

2. The mobile terminal of claim 1, wherein the antenna comprises:
a first layer including conductors; and
a second layer plated on the first layer and configured for at least transmitting or receiving the wireless signal,
wherein the second layer is formed of a conductive material.

3. The mobile terminal of claim 2, wherein the first layer is printed on the first end surface of the body and formed in a pattern with ink that contains the conductors.

4. The mobile terminal of claim 2, wherein the first layer further includes a binder resin configured for adhering the conductors to at least an inner surface or an outer surface of the first end surface of the body.

5. The mobile terminal of claim 2, wherein the antenna further comprises a third layer configured for protecting the second layer and plated on the second layer.

6. The mobile terminal of claim 1, wherein the first display unit comprises:
a window mounted to the front surface of the body; and
a transparent display formed of a transmissive material and configured to display the visual information,
wherein the transparent display is covered by the window.

7. The mobile terminal of claim 1, wherein the body includes a transmissive region and a non-transmissive region, the mobile terminal further comprising:
a second display unit positioned on the front surface of the body at the non-transmissive region,
wherein the first display unit is positioned at the transmissive region.

8. The mobile terminal of claim 7, further comprising a circuit board positioned at the non-transmissive region and configured for processing the wireless signal,
wherein the circuit board is electrically coupled to the antenna.

9. The mobile terminal of claim 1, wherein the first display unit is configured as a user input unit and the visual information is user input information, the first display unit comprising:
a case formed of a transmissive material and forming an appearance of the body; and
a touch sensor covering a surface of the case and configured for receiving a touch input.

10. The mobile terminal of claim 9, further comprising a circuit board electrically coupled to the touch sensor and configured for processing the wireless signal.

11. The mobile terminal of claim 10, wherein the touch sensor is positioned between the circuit board and the antenna.

12. The mobile terminal of claim 1, wherein the antenna is positioned at the first end surface of the body.

13. The mobile terminal of claim 12, further comprising:
a circuit board configured for processing the wireless signal; and
an antenna feeding portion positioned at the first side surface of the body and configured for electrically coupling the antenna to the circuit board.

14. The mobile terminal of claim 12, wherein the antenna comprises:
a plate positioned at the first end surface of the body, the plate having a first surface and a second surface opposite the first surface;
a first antenna pattern formed on the first surface of the plate; and
a second antenna pattern formed on the second surface of the plate.

15. The mobile terminal of claim 14, wherein:
the first antenna pattern and the second antenna pattern are electrically coupled to each other via a connection path formed at an edge surface of the plate positioned between the first surface of the plate and the second surface of the plate.

16. The mobile terminal of claim 1, wherein the body comprises:
a case formed of a transmissive material; and
a cover mounted to the case and configured for forming an appearance of the body.

17. The mobile terminal of claim 16, wherein the cover comprises a first cover member and a second cover member positioned transverse to each other, the mobile terminal further comprising:
a circuit board configured for processing the wireless signal; and
an antenna feeding portion positioned on the second cover member of the cover and configured for electrically coupling the antenna to the circuit board,
wherein the first cover member is configured for covering the antenna.

18. A mobile terminal, comprising:
a body having a front surface, a rear surface positioned opposite the front surface, a first end surface positioned between the front surface and the rear surface at a first end of the body, and a first side surface positioned between the front surface and the rear surface at a first side of the body and extending from the first end surface;
a display unit positioned on the front surface of the body proximate the first end surface of the body and configured for displaying visual information;
an antenna positioned on the first end surface of the body; and
a circuit board electrically coupled to the antenna and configured for processing a wireless signal,
wherein the circuit board is covered by the front surface of the body,
wherein the antenna includes a first layer formed on the first end surface of the body and a second layer plated on the first layer,
wherein the first layer of the antenna contains conductors, and
wherein the second layer is formed of a conductive material and configured for at least transmitting or receiving the wireless signal.

19. The mobile terminal of claim 18, further comprising a light transmission unit positioned adjacent to the antenna and configured for allowing light to pass from the front surface of the body to the rear surface of the body.

20. The mobile terminal of claim 19, wherein:
the body comprises a first body portion and a second body portion coupled to each other and configured to move relative to each other between a closed configuration and an open configuration; and
the light transmission unit is formed on one of the first body portion or the second body portion and is configured to be covered by the other of the first body portion or the second body portion when the mobile terminal is in the closed configuration.

21. The mobile terminal of claim 18, wherein the display unit is configured as a user input unit and the visual information is user input information, the display unit comprising:
a case formed of a transmissive material and forming an appearance of the body; and
a touch sensor covering a surface of the case and configured for receiving a touch input.

22. The mobile terminal of claim 21, wherein the touch sensor is electrically coupled to the circuit board.

* * * * *